INVENTOR.
Wayne B. Darr
BY
ATTORNEY.

Dec. 20, 1960
W. B. DARR
2,965,152
TIRE PROCESSING APPARATUS
Filed Sept. 6, 1955
2 Sheets-Sheet 2
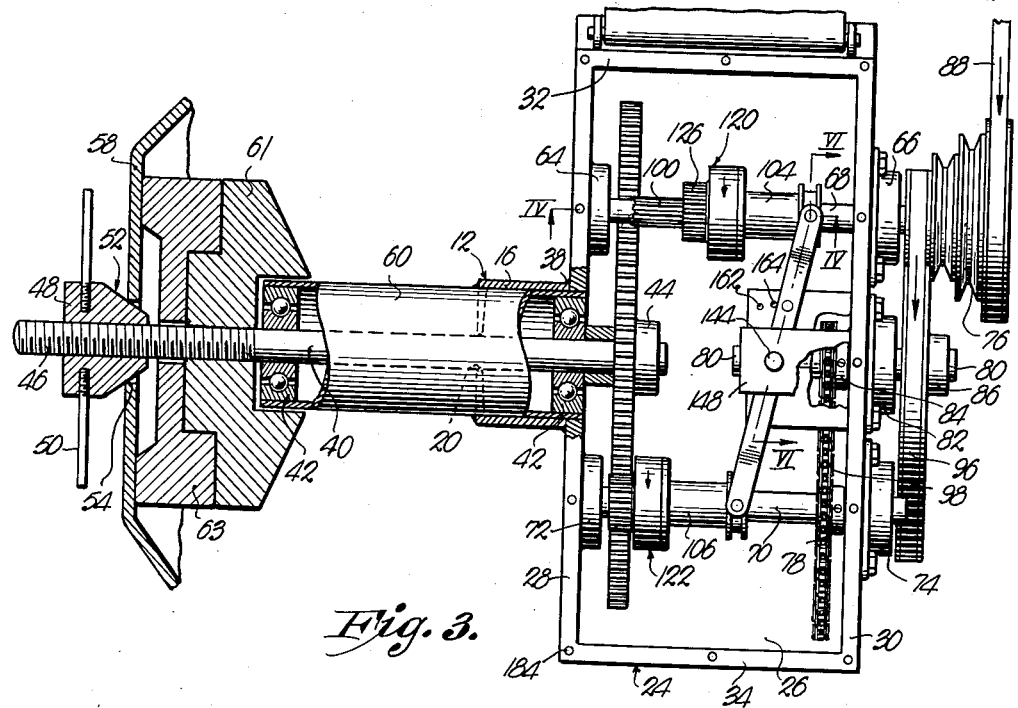
Fig. 3.
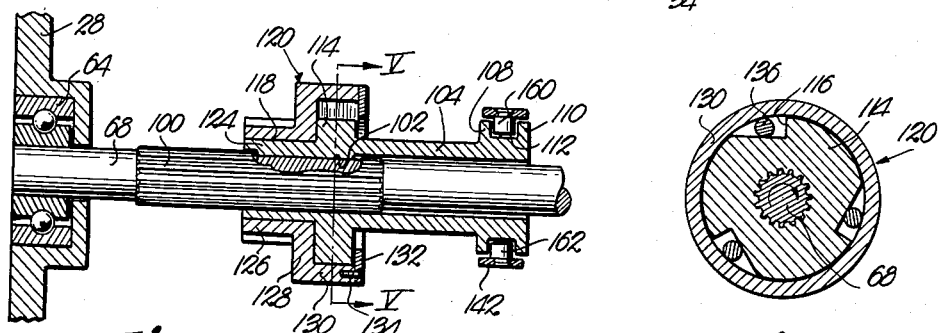
Fig. 4.
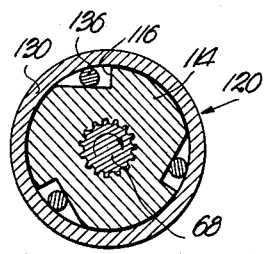
Fig. 5.
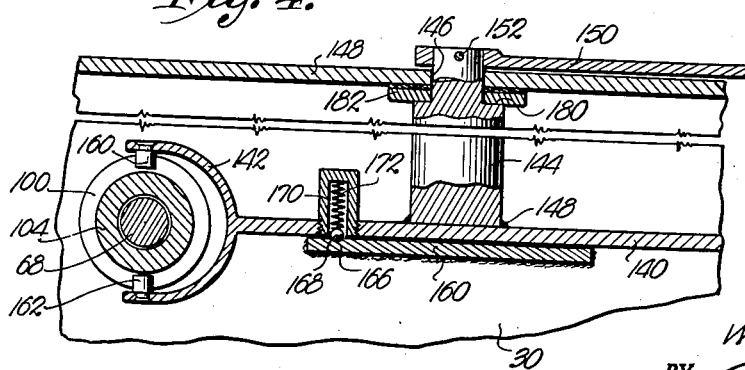
Fig. 6.
INVENTOR.
Wayne B. Darr
BY 
ATTORNEY.

United States Patent Office 2,965,152
Patented Dec. 20, 1960

2,965,152

TIRE PROCESSING APPARATUS

Wayne B. Darr, N. Main St., Seneca, Mo.

Filed Sept. 6, 1955, Ser. No. 532,416

5 Claims. (Cl. 154—9)

This invention relates generally to the field of processing apparatus for automotive and other vehicular tires and, more particularly, to an improved machine for use in connection with the capping or retreading of a tire by the process wherein a recapping face strip or "camel-back" is cementitiously applied to the circumferential surface of the tire after the latter has been buffed to render the same substantially truly circular in cross-section and wherein the tire is thereafter balanced with respect to its center after application of the camel-back.

Previously known machines have all been subject to various disadvantages rendering the recapping job accomplishable therewith unsatisfactory or/and involving undue inconvenience and expenditure of time and labor in carrying out the recapping procedure. Particularly notable among these faults of prior apparatuses is the tendency of same to buckle or cause wrinkling in the camel-back as it is being applied to the buffed tire casing.

Accordingly, it is the primary object of this invention to provide tire processing apparatus overcoming all of the above mentioned and other disadvantages inherent in prior machines through the provision of improved apparatus which is simpler in construction and operation, efficient and effective in performance and convenient and inexpensive to manufacture.

Another important object of this invention is to provide such apparatus wherein provision is made for the rotation of the tire casing to which the camel-back is to be applied, rather than the roller which presses the camel-back onto the casing, and wherein such tire casing is rotated in a direction which tends to stretch the camel-back tightly upon the casing and, therefore, prevent buckling or wrinkling.

Another important object of the invention is to provide such apparatus wherein the tire casing may be rotated at a relatively fast speed for application of cementitious material thereto, then selectively rotated at a slower speed during application of the camel-back, then placed in a condition for free rotation for balancing of the capped tire.

Another important object of the invention is to provide overrunning clutch means permitting the operator of the machine to manually rotate a tire thereon at a greater speed even when the machine itself is drivingly rotating the tire in the same direction at a lower speed.

Another important object of the invention is to provide pneumatic cylinder means for selectively positioning the camel-back press down roller during various parts of the cycle of operation of the machine throughout the entire recapping and balancing procedure.

Another important object of the invention is to provide a machine of the general class referred to which is adaptable for use both with that type of tires using innertubes and that type of tires referred to as "tubeless" now commonly being used on many vehicles.

Another important object of the invention is to provide such a machine having parts adapting the same for receiving a tire to be processed without the removal thereof from the wheel on which such tire is to be used, with consequent advantages in the trueness of rendering the tire round and balanced relative to its center when mounted upon the wheel in the manner it will be installed on a vehicle.

Still other important objects of the invention, including certain significant details of construction, will be made clear or become apparent as the following description of the invention progresses.

In the accompanying drawings:

Fig. 3 is a fragmentary, top plan view, with certain parts being broken away and shown in section for clarity of illustration, of the tire mounting shaft and the mounting and driving means therefor;

Fig. 4 is a fragmentary cross-sectional view taken on line IV—IV of Fig. 3;

Fig. 5 is a cross-sectional view taken on line V—V of Fig. 4; and

Fig. 6 is a fragmentary cross-sectional view taken on irregular line VI—VI of Fig. 3.

Figures 1, 2:
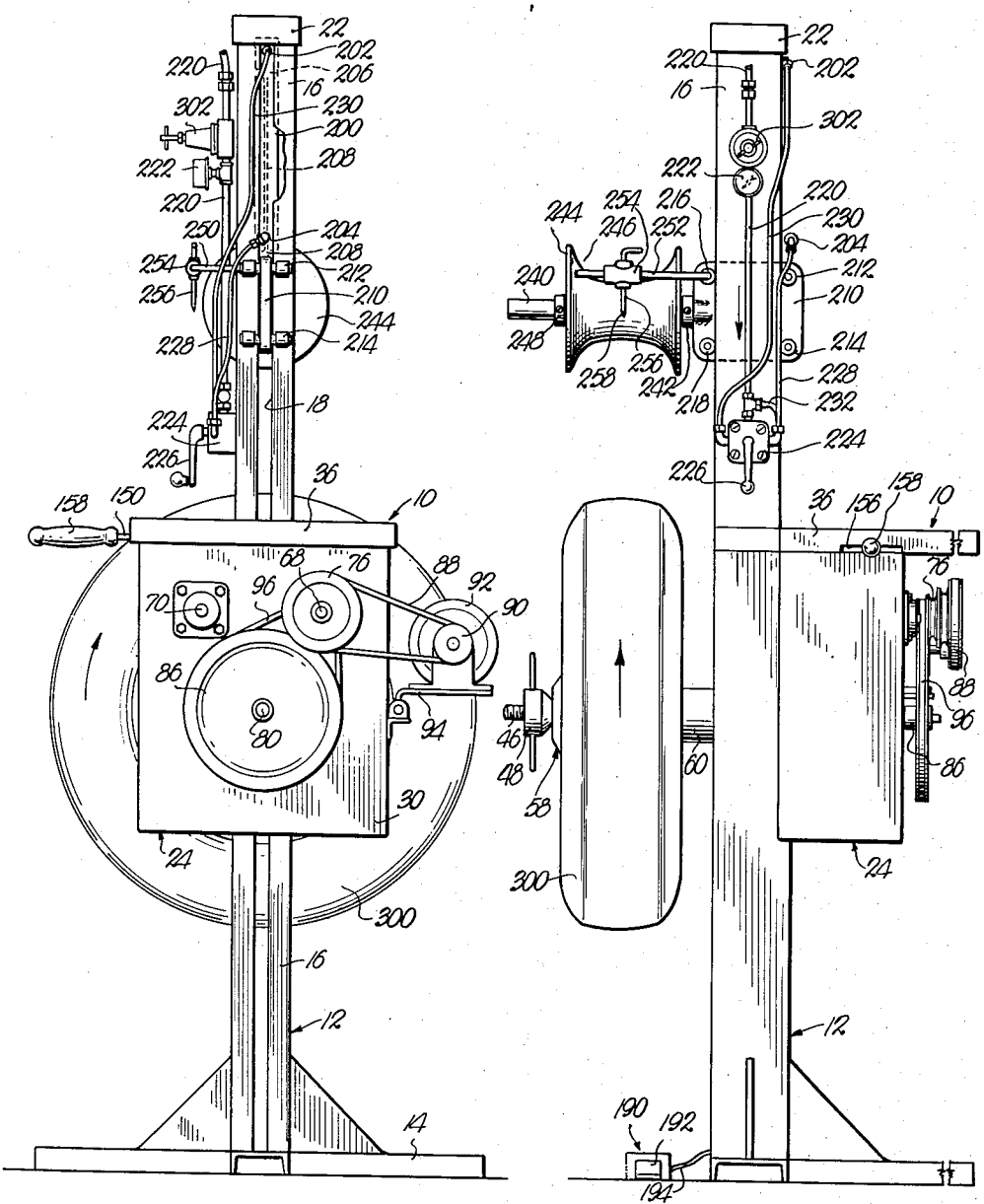
Figure 1 is a side elevational view of one embodiment of apparatus made in accordance with this invention.
Fig. 2 is a front elevational view of the apparatus shown in Fig. 1.

The utility and reasons for the improved results attainable with the apparatus of this invention, as compared with prior machines, will be more readily understood, if brief reference is first made to the steps involved in the processing of a tire during recapping or retreading thereof. Accordingly, one process for accomplishing such processing is summarily outlined immediately hereinbelow.

A tire to be recapped or retreaded is normally first buffed down by the use of apparatus forming no part of this invention until the tire casing is rendered circumferentially round and until the circumferential face of the tire casing is given the proper degree of transverse curvature for receiving the recapping camel-back thereon. During such buffing step, the tire casing may be either mounted upon a special rim or spindle provided in the buffing apparatus or may be left upon the vehicle wheel on which it is normally used, depending upon the nature of the buffing apparatus. It has been found most advantageous to carry out both the buffing and the later recapping and balancing steps of the process with the tire installed upon the vehicle wheel in normal fashion, and most buffing machines now being used are adapted for such mode of operation. Obviously, such procedure is quite advantageous in connection with the relatively new tubeless type tires, which are installed with a relative degree of permanency upon the rim of the wheel on which they are to be used.

The next step of the overall process involves the mounting of the buffed tire with the latter normally inflated upon a machine for turning the tire at a relatively high speed of the order of sixty revolutions per minute. While the tire, which may be either on its regular vehicular wheel or on a rim or supporting disc provided as a part of the turning machine, is being rotated at such speed, a thin coating of cementitious material is spread upon the circumferential face of the tire casing upon which the camel-back is to be applied. The material most commonly used for this purpose is generally known as vulcanizing cement.

After the adhesive cement has been applied to the tire casing in a uniform thin coating, it is then necessary to stop the rotation of the tire while the end of a camel-back strip is properly emplaced or started upon the circumferential surface of the tire. It is then necessary to bring a pressure roller of suitable configuration into engagement with the camel-back which has been started on the tire and to rotate the tire at a relatively low speed of the order of three revolutions per minute while the operator guides the remainder of the camel-back on the tire casing and the roller presses same into tight engagement with the casing and cementitious material thereon. After the tire has made a complete revolution at the mentioned low speed, the camel-back will be in substantially circumscribing relationship to the tire, and it is necessary to stop the rotation of the latter so that the operator may cut off any excess length of the camel-back and effect a proper splice between the two ends of the camel-back.

It is then desirable for the tire to be rendered freely rotatable, so that the operator may balance the same with respect to its center by shaving from the camel-back small amounts on the sidewall of the tire or adding balancing strips of camel-back on the sidewall of the tire, as may be appropriate and most expeditious.

The tire is then dismounted from the apparatus of this invention, deflated and heat cured in molds which are conventional in form and constitute no part of the present invention.

With these foregoing considerations relative to the overall process in mind, the functioning of the various parts of the apparatus of this invention in their cooperation with each other and the significance of the various improved features provided in the apparatus will be apparent from the following description of the apparatus itself and its operation.

Referring now to the accompanying drawings, the numeral 10 generally designates the apparatus contemplated by this invention, and the numeral 12 more particularly designates generally the base or frame structure of the apparatus 10. Frame structure 12 includes a floor engaging base 14 and an elongated upstanding tubular member 16 provided with opposed longitudinal slots 18 and 20. A top or cap 22 is provided upon member 16, and it will be clear that the latter may constitute a pair of spaced, opposed channel members interconnected with the base 14 at their lowermost ends and by the top 22 at their uppermost ends, in the manner suggested by Fig. 3.

Suspended on the upright member 16 is a liquid-tight transmission box generally designated 24 and adapted to be filled with oil for the lubrication of the running parts therein contained and hereinafter to be identified. Box 24 has a bottom wall 26, a pair of spaced, opposed side walls 28 and 30, a pair of spaced opposed end walls 32 and 34 and a top cover plate 36. Box 24 may be mounted on the upright 16 in any suitable manner such as by welding as at 38. It may be noted that the box 24 is disposed intermediate the height of the upright 16 of frame structure 12 at a level convenient to an operator of the apparatus 10, as will hereinafter become more apparent.

A shaft 40 extends beyond the side wall 28 of box 24, being journalled for free rotation upon a horizontal axis by a pair of roller bearing means 42 disposed within cylindrical spindle 60 supported by upright member 16. A large peripherally toothed gear 44 is rigidly mounted upon the shaft 40 within the box 24. Adjacent its opposite extremity the shaft 40 is threaded as at 46 to receive a spindle nut 48 preferably provided with turning handles 50 and having a frusto-conical face 52 adapted to engage the inner surface 54 of the central, perforated portion 58 of a vehicle wheel and generally designated by the numeral 58. It is to be understood that a special tire holding rim equivalent to wheel 58 may be utilized in lieu thereof and normally forming a part of machine 10. The tire holding rim referred to above should preferably be removably secured to shaft 40 in order to facilitate placement and removal of tire casings from the special tire holding rim. Shaft 40 also supports a collar 61 contoured to accommodate a buffing wheel when a wheel 58 is not in place. This collar 61 is spaced from spindle 60 and is internally threaded to receive shaft 40. The movement of collar 61 toward the proximal end of spindle 60 is limited by the zone of meeting between threaded portion 46 of shaft 40 and the unthreaded portion thereof.

When it is desired to mount a wheel, adaptor 63 is employed. It is slipped over shaft 40 and into engagement with collar 61 as shown in Fig. 3 and when wheel 58 is in place the pressure exerted by nut 48 serves to hold in operative and assembled relation the collar 61, adaptor 63 and wheel 58. When shaft 40 is rotated, these parts will travel therewith.

Obviously, the precise form of spindle 60 and spindle nut 48 could be considerably varied without departing from the spirit of this invention, the important thing being that such parts are adapted for properly centering and tightly holding the wheel or tire receiving rim assembly 58 may be varied to a certain extent, the structure shown for purposes of illustration in Fig. 3 being intended to indicate one typical form of assembly 58. It is noted in this connection that the shaft 40 and associated parts illustrated are adaptable for ordinary use with wheel assemblies 58 such as are employed on most automobiles and similar vehicles.

Rotatably journalled by a pair of bearings 64 and 66 respectively secured to the side walls 28 and 30 of box 24 is an elongated horizontal shaft 68 having its longitudinal axis of rotation in spaced parallelism to the extended axis of rotation of shaft 40. Similarly, a shaft 70 is journalled in bearings 72 and 74 respectively secured to side walls 28 and 30 of box 24 for rotation upon a horizontal axis in spaced parallelism with the axis of rotation of shaft 68. Shaft 68 extends substantially beyond side wall 30 of box 24 and has a multiple sheave conical pulley 76 rigidly mounted thereon. The shaft 70 has a sprocket wheel 78 rigidly mounted thereon within the box 24. A horizontal stub shaft 80 having its axis of rotation between, below and in spaced parallelism with the axes of rotation of shafts 68 and 70 extends through side wall 30 of box 24 and is rotatably mounted on the latter by a bearing 82. Within the box 24, the stub shaft 80 is provided with a sprocket wheel 84 rigidly mounted thereon and of relatively smaller diameter than the sprocket wheel 78 on shaft 70. Outside of the box 24 the stub shaft 80 is provided with a pulley 86 rigidly mounted thereon and of relatively larger diameter than the sheaves of pulley 76.

Pulley 76 is coupled by a belt 88 with the drive pulley 90 of an electric motor 92 mounted upon the box 24 by bracket means 94. Pulley 76 is operably connected by a belt 96 with the pulley 86 on stub shaft 80. Sprocket wheels 78 and 84 are interconnected by a chain 98. Thus, motor 92 is coupled for continuous rotation of shaft 68 at a speed determined by the ratio of sizes of the drive pulley 90 and the particular sheave of pulley 76 in which the belt 88 is engaged and is also coupled for continuously driving the shaft 70 for rotation in the same direction as shaft 68 but at a substantially lesser speed by virtue of the speed reduction effected through the coupling of pulleys 76 and 86 by belt 96 and the coupling of sprocket wheels 84 and 78 by chain 98.

The shafts 68 and 70 are each longitudinally ribbed as illustrated at 100 upon the shaft 68 adjacent the ends of shafts 68 and 70 proximate the bearings 64 and 72 respectively.

Splined upon the shafts 68 and 70 as at 102 (Fig. 4) are collars 104 and 106, such collars 104 and 106 being slidably reciprocable along the lengths of shafts 68 and 70 respectively but mounted for continuous rotation with said shafts. Adjacent the end thereof proximate side wall 30 of box 24 each of the collars 104 is provided with a pair of spaced peripheral flanges 108 and 110 presenting a circumferential yoke receiving groove 112 therein. Intermediate the extremities of each of collars 104 and 106 is provided a generally circular flange portion 114 having a plurality of peripherally cut away portions presenting ball receiving niches 116 of substantially triangular cross-section and all oriented in the same direction with respect to the circumference of flange portion 114 (see Fig. 5).

The portion of each of collars 104 and 106 between the flange portions 114 thereof and the extremities of such collars 104 and 106 proximate bearings 64 and 72 respectively are machined to present a cylindrical external bearing surface 118 for receiving a gear and clutch element generally designated 120 for the element upon collar 104 and 122 for the element upon collar 106. The portion of the collars 104 and 106 carrying bearing surfaces 118 are designated 124 for identification. Each of the elements 120 and 122 include a pinion portion 126 disposed directly over the portions 124 of collars 104 and 106 respectively, an outturned flange portion 128 alongside the corresponding flange portion 114 of the collar 104 or 106 and a hollow cylindrical band portion 130 extending from the flange portion 128 in overlying relationship to the flange portion 114 of the collars 104 and 106 respectively. An annular plate 132 is secured by screws or the like 134 upon the band portion 130 of each of elements 120 and 122 to retain the latter upon the corresponding collar 104 or 106 and in operative relationship to the flange portion 114 of the latter. A ball or roller 136 is provided within each of the niches 116 of each of the flange portions 114. As will be clear from Figs. 4 and 5, the flange portions 114 of collars 104 and 106, the band portions 130 of elements 120 and 122 and the band 136 present upon each of the shafts 68 and 70 an overrunning clutch assembly for interconnecting the pinion portions 126 of elements 120 and 122 with the shafts 68 and 70 respectively as regards relative rotation between the elements 120 and 122 and the shafts 68 and 70 respectively in one direction.

An elongated yoke arm 140 provided with a bifurcated termination 142 at each end thereof is pivotally mounted for swinging movement upon a vertical axis by a stub shaft 144 depending from and journalled in a perforation 146 of a bracket 148 secured to the side wall 30 within the box 124. As will be apparent from Fig. 3 and Fig. 6, such stub shaft 144 is rigidly attached to the yoke arm 140 intermediate the extremities of the latter by means such as welding as at 148. A handle 150 is secured to the upper extremity of stub shaft 144 by a pin or the like 152 and extends out through a slot 156 provided in the top cover plate 36 of box 24, a knob 158 preferably being provided on the extremity of handle 150 for rendering manipulation of the latter by an operator convenient.

Each of the bifurcated yoke portions 142 of the arm 140 is provided with a pair of opposed inwardly extending rollers 160 and 162 which are oppositely received within the groove 112 of each of collars 104 and 106 respectively. It will thus be apparent that, as the handle 150 is manipulated in one direction, the arm 140 will be swung to move the collar 104 and element 120 in the direction of gear 44 and the other collar 106 and the other element 122 will be swung in a direction away from the gear 44. The pinion portions 126 of each of elements 120 and 122 are adapted for operative engagement with the gear 44 when the corresponding element 120 or 122 is shifted to an extreme position adjacent the side wall 28 of box 24.

It may be noted that the handle 150 and the arm 140 actually have three operative positions of swinging movement including one at each of the opposite extremes for engaging the pinion portion 126 of a different element 120 or 122 with the gear 44 and an intermediate position in which neither of the pinion portions 126 is engaged with the gear 44. In order to provide for positive setting of the handle 150, and accordingly the arm 140, in one or the other of these operative positions, a bracket plate 160 is secured to side wall 30 within box 24 and extends horizontally therefrom. Bracket plate 160 is provided with three concavities 162, 164 and 166 adapted to be engaged by a ball detent 168 carried by a cap 170 mounted on the arm 140, the ball 168 being yieldably urged toward the plate 160 by a spring 172. Such structure obviously provides for positive setting of the handle 150 in any of its three operative positions. It may be noted that the stub shaft 144 is preferably shouldered as at 180 below the bracket 148 and that a felt covered washer 182 is provided between the shoulder 180 and the lower face of bracket 148 for maintaining the stub shaft 144 in position for operative action by the ball detent 168 with the cavities 166.

When the apparatus 10 is assembled for operation, it will be understood that the box 24 is preferably filled with lubricant and that the top cover 36 is held in place by screws or the like (not shown) cooperable with a number of spaced screw receiving perforations 184 in the uppermost edges of the side walls 28 and 30 and the end walls 32 and 34 of box 24 or, if desired, in an inturned flange formed on each of the latter at the uppermost edge thereof.

An electrical foot switch generally designated 190 having a foot operable pedal 192 is preferably provided as a part of the apparatus 10 and interconnected with the motor 92 by suitable conductive means 194 by which the operation of the motor 92 can be controlled by an operator through engagement of his foot with the pedal 192.

Secured to the top 22 of frame structure 12 and depending downwardly therefrom within the upright member 16 above the box 24 is a fluid operable pressure cylinder 200 having an upper port 202, a lower port 204 and an internal piston 206 shiftable therewithin between the ports 202 and 204. Piston 206 is attached to a piston rod 208 extending out the lowermost extremity of cylinder 200. Secured to the piston rod 208 is carriage means including a plate 210 extending through the slots 18 and 20 of member 16 on opposite sides of the latter. The plate 210 is mounted for linear vertical reciprocation along member 16 by the provision of an upper pair 212 and a lower pair 214 of rotatable rollers on opposite sides of the portion of plate 210 extending out of member 16 through slot 18 and an upper pair 216 and a lower pair 218 of rotatable rollers similarly extending from the opposite sides of that portion of plate 210 protruding from member 16 through slot 20.

Although the cylinder assembly 200 could conceivably operate with hydraulic or other types of fluid pressure, operation by pneumatic pressure is to be preferred and, accordingly, a source of air under pressure (not shown) is coupled with a conduit 220 leading through suitable pressure gauges and the like 222 to a three-position valve 224 having an operating lever 226. Valve 224 is adapted, when lever 226 is moved in one direction, to deliver air under pressure to a conduit 228 coupling the valve 224 with the lower port 204 of cylinder 200. When the lever 226 is moved in an opposite direction, the valve 224 is adapted to couple air under pressure from conduit 220 with the upper port 202 of cylinder 200 through a conduit 230. When the lever 226 is in a neutral position, as illustrated in Fig. 2, the valve 224 is adapted for closing the valve ends of both of conduits 228 and 230 to maintain the air pressures theretofore existing in each of same, and accordingly, above and below the piston 206 within the cylinder 200 for holding the piston 206 in the position which it occupied at the time that lever 226 was manipulated to the neutral position. When air pressure operation for the cylinder 200 is employed, a take-off outlet 232 is preferably tapped into the conduit 220 for connection with that apparatus (not shown) used for the spraying of cementitious material upon a tire being processed, such connection 232 not being herein shown in detail, however, since it does not form an essential part of the present invention.

It will thus be clear that by proper manipulation of the lever 226 of valve 224 air pressure may be applied to the cylinder 200 in such a manner as to force the piston 206 upwardly or downwardly or to maintain the same in a given position.

Secured to the plate 210 and extending horizontally above and in parallelism with the shaft 40 is a stub shaft 240. Such shaft 240 may be welded to the plate 210 as at 242 or otherwise securely attached in fixed position thereon. Rotatably mounted on the shaft 240 is a pressure roller 244 having a concavely arcuate circumferential surface 246 of predetermined size and curvature adapted to conform substantially to the outer configuration of the circumference of a tire with camel-back properly emplaced thereon. The roller 244 is mounted upon the shaft 240 both for free rotation and for limited shifting movement axially of the shaft 240 by means of a pair of spaced retaining collars 248 and 250 secured on the shaft 240 with the roller 244 therebetween, the collars 248 and 250 being spaced a greater distance than the corresponding dimension of the roller 244 to permit the mentioned shifting movement of the latter. It will be understood that various sizes of rollers 244 may be emplaced upon the shaft 240 as desired to accommodate various sizes of tires being processed by simply removing the collar 248 temporarily, effecting the substitution of a new roller 244, and then replacing the collar 248.

Mounted on the plate 210 and extending therefrom is an L-shaped rod 250 having a horizontal leg 252 extending in parallelism with the shafts 40 and 240 and slightly above and to the front of the latter. Mounted on the leg portion 252 of rod 250 is an adjustably slidable collar 254 in turn carrying a vertical index marking pin 256 adapted to be adjusted vertically relative to the collar 254. The lowermost indicating end 258 of pin 256 may thus be adjusted either vertically by adjustment of pin 256 relative to the collar 254 or horizontally by adjusting the collar 254 along the rod portion 252. Suitable construction permitting these adjustments has been found to utilize a frictional engagement between the collar 254 and the rod portion 252 and a frictional engagement between the pin 256 and the collar 254 with set-screws (not shown) being provided if desired to lock the mentioned parts in an adjusted position more positively.

In operation, the apparatus 10 has a tire to be processed (designated 300 for purposes of identification) installed thereon by removing the spindle nut 48, placing the wheel or tire holding rim assembly 58 upon the shaft 40 with the hub 56 in fully fitted and abutting relationship upon the spindle 60, and the spindle nut 48 is then replaced and screwed down tightly upon the threads 46 of shaft 40 to center the wheel assembly 58 upon shaft 40 and thereby fixedly mount the tire 300 in properly centered relationship upon the shaft 40. It will be understood that the tire 300, when so installed upon the apparatus 10, has already been properly buffed and is inflated with air to its normal pressure. It will also be understood that during the installation of the wheel assembly 58 and tire 300 upon apparatus 10, the foot pedal motor switch 190 remains unoperated to maintain the motor 92 deenergized, the handle 150 is preferably in its neutral position to permit free rotation of the shaft 40, and the shaft 240 and roller 244 have been raised and locked in the position illustrated in Figs. 1 and 2, which is substantially spaced above the tire 300, by proper manipulation of the lever 226 of valve 224 to first furnish air under pressure through conduit 228 to lower port 204 of cylinder 200 and then manipulating the lever 226 to close off both of conduits 228 and 230 for holding the plate 210 in the desired, raised position.

The knob 158 is then moved to the extreme right as shown in Fig. 2 to swing the arm 140 to the opposite position from that illustrated in Fig. 3, thereby bringing the pinion portion 126 of element 120 on shaft 68 into operative engagement with the gear 44, it being noted that the pinion portion 126 of element 122 will be simultaneously moved away from operative engagement with the gear 44. The operator may then exert pressure upon the foot pedal 192 to close the electrical circuit for the motor 92, whereupon the shaft 40 will be positively driven to turn the tire 300 at relatively high speed in the direction shown by the arrows in Figs. 1 and 2. While the tire 300 is being so rotated, the operator will apply a thin coating of cementitious material upon the portion of tire 300 to receive the camel-back, such application being most conveniently accomplished by spraying.

After the application of the cement has been completed, the operator will remove his foot from switch 190 to deenergize the motor 92 and will shift the knob 158 to the middle or neutral position moving the pinion portions 126 of both of elements 120 and 122 out of engagement with the gear 44. He will then start the leading edge of the camel-back upon the tire 300 by emplacing the same thereupon and operating the lever 226 of valve 224 to supply air to the upper port 202 of cylinder 200, which will force the piston 206 and piston rod 208 downwardly to move the tire engaging surface 246 of roller 244 into pressing relationship upon the end portion of camel-back just emplaced upon the tire 300. It may be noted that the shiftable mounting of the roller 244 upon the shaft 240 permits the roller 244 to automatically shift along the rod 240 for proper positioning of the surface 246 relative to the tire 300. It may also be noted that, although the piston 206 and plate 210 may merely be locked in the position disposing the surface 246 of roller 244 properly with respect to the camel-back started on the tire 300, and that this may be accomplished simply by manipulating the lever 226 of valve 224 to the holding position, it is usually preferred for the roller 244 to be biased downwardly upon the tire 300 during the installation of the camel-back with some predetermined downward force being exerted thereon. For this purpose, an adjustable pressure valve 302 may be interposed in the conduit 220 and adjusted until the desired pressure is read upon gauge 222, it being understood that in this mode of operation the lever 226 will be left in a position for exerting the predetermined pneumatic pressure continuously through upper port 202 of cylinder 200 to force the piston 206 downwardly.

As soon as the camel-back is properly started upon the tire 300, the guide pin 256 should be properly positioned relative to the collar 254 and the latter properly positioned upon the rod portion 252 for serving as a guide to the operator in feeding the camel-back onto the tire 300 as the latter is rotated, it being noted that conventional camel-backs such as are commonly available on the market are usually provided with an index or guide line down the center thereof. It may finally be observed in this connection that, although different operators vary as to the downward pressure to be maintained on the roller 244 during installation of the camel-back, a satisfactory pressure has been found to be maintained when a pneumatic pressure of between forty and fifty pounds per square inch is maintained in a cylinder 200 having a diameter of two and one-half inches.

Next, the knob 158 should be shifted to its leftmost position as is illustrated in Fig. 2 to move the arm 140 to the position illustrated in Fig. 3. This will move the pinion portion 126 of element 122 into engagement with the gear 44 for rotating the shaft 40 at a relatively low speed when the motor 92 is again energized by operation of the foot switch 190. Assuming the previously mentioned steps to have been completed, the operator exerts foot pressure upon the pedal 192 energizing the motor 92 to advance the tire 300 in the direction shown by the arrows in Figs. 1 and 2, although at a very low speed. During such advancement of the tire 300 the operator guides the camel-back upon the tire 300 slightly in advance of the zone of contact with the camel-back of the surface 246 of roller 244. Should it be advantageous for the operator to momentarily feed the camelback onto the tire 300 and under the roller 244 at a greater rate than the shaft 40 is being rotated, he may manually rotate the tire 300 and shaft 40 as far as desired at such greater speed by virtue of the over-running clutch action between element 122 and collar 106.

When one revolution of the tire 300 has been completed and the camel-back installed in substantially circumscribing relationship thereto, the operator will release his pressure from the switch pedal 192 and will shift the knob 158 to move arm 140 into its neutral position permitting free rotation of the shaft 40 in either direction. He may then properly cut off any excess of camel-back and effect a splice between the ends of the camel-back upon the tire 300. The rotation of the tire 300 will then preferably be continued to fully complete the revolution of tire 300 so that the roller 244 will completely set the entire length of camel-back including the splice between the extremities thereof.

The lever 226 of valve 224 will then be operated to raise the shaft 240 and roller 244 out of engagement with the tire 300 and to maintain the same in a position spaced thereabove, as illustrated in Figs. 1 and 2.

The tire may now be balanced by the operator upon the apparatus 10 by spinning the wheel assembly 58 and tire 300 in the usual manner and cutting or applying portions of camel-back disposed along the sidewall of the tire 300 as may be required for proper balancing. Although with the apparatus 10 such spinning of the tire 300 could be manually accomplished by simply moving the knob 158 and arm 140 to their neutral positions, the structure provided advantageously contemplates that the knob 158 may be shifted to the high speed position bringing the pinion portion 126 of element 120 into operative engagement with gear 44. The foot switch 190 may then be operated to impart high speed rotation to the shaft 40 and the tire 300, whereupon the foot switch 190 may be opened and the knob 158 and arm 140 moved to their neutral positions for rendering the shaft 40 in free rotation. The overrunning clutch feature of the element 120 and collar 104 prevent any braking of such spinning rotation of the tire 300 after the switch 192 has been closed and until the knob 158 has been operated to disengage the pinion portion 126 of element 120 from the gear 44. Obviously, such overrunning clutch feature also tends to prevent any damage to the interengaging surfaces of gear 44 and pinion portion 126 of element 120 during shifting of the element 120 away from the gear 44.

After the tire 300 is properly balanced, it may be removed from the apparatus 10 for curing in conventional manner.

It will now be apparent that the apparatus 10 provided by this invention is ideally suited for accomplishing all of the above mentioned objectives desired in apparatus for the subject purpose. It is to be particularly noted in this respect that, by driving the tire 300 rather than the roller 244, the action upon a camel-back being applied to the tire 300 is one of smoothing and stretching. This result is obviously much to be desired and marks one of the important advantages of the present invention over prior constructions wherein the camel-back was wrinkled and buckled during installation. It should also be pointed out that the configuration of the face 246 of roller 244 is ideally adapted for properly forcing the camel-back upon the tire 300, including the normally feathered wings or edges of the camel-back which fit along the sidewalls of the tire 300.

Those skilled in the art will immediately perceive that certain minor modifications and changes could be made from the exact structure shown and described for purposes of illustration without departing from the true spirit and intention of the invention. Accordingly, it is to be understood that the invention shall be deemed limited only by the scope of the appended claims.

Having thus described the invention, what is claimed as new and desired to be secured by Letters Patent is:

1. In apparatus for applying a camelback to the tread portion and sidewalls of a tire casing, a frame structure; a first elongated shaft; means rotatably mounting said shaft on said frame structure for normally free, relatively frictionless rotation with respect to the latter and about a fixed axis; a rim assembly adapted for mounting said tire casing in a fully inflated condition; spindle means on said first shaft releasably securing the rim assembly to said first shaft in concentric relationship thereto and for rotation therewith; a first pinion secured to said first shaft in coaxial relationship therewith; a rotatable second pinion mounted on the frame structure for movement into and out of operable intermeshing relationship with said first pinion for rotating the latter and thereby said first shaft and the rim assembly; a prime mover; means operably coupling said prime mover to the second pinion for rotating the latter regardless of the position thereof with respect to said first pinion; shaft means; carriage means shiftably mounting said shaft means on said frame structure for movement toward and away from said first shaft; mechanism on the frame structure for releasably holding said shaft means in a predetermined position relative to said first shaft; and pressure and camelback wrinkle-removing roller means mounted on said shaft means for normally free rotation whereby when said roller means is moved into engagement with an inflated tire on said rim assembly and the latter is rotated by the prime mover during interengagement of said pinions, the camelback fed onto the tread portion and sidewalls of the tire casing is pressed into firm engagement therewith by said roller means.

2. In apparatus for applying a camelback to the tread portion and sidewalls of a tire casing, a frame structure; a first elongated shaft; means rotatably mounting said shaft on said frame structure for normally free, relatively frictionless rotation with respect to the latter and about a fixed axis; a rim assembly adapted for mounting said tire casing in a fully inflated condition; spindle means on said first shaft releasably securing the rim assembly to said first shaft in concentric relationship thereto and for rotation therewith; a first pinion secured to said first shaft in coaxial relationship therewith; a rotatable second pinion mounted on the frame structure for movement into and out of operable intermeshing relationship with said first pinion for rotating the latter and thereby said first shaft and the rim assembly; a prime mover; means operably coupling said prime mover to the second pinion for rotating the latter regardless of the position thereof with respect to said first pinion; a second elongated shaft; carriage means shiftably mounting said second shaft on said frame structure for movement toward and away from said first shaft, the longitudinal axes of said shafts being substantially parallel; mechanism on the frame structure for releasably holding said second shaft in a predetermined position relative to said first shaft; and a pressure and camelback wrinkle-removing roller having a transversely concave surface substantially complemental with the tread portion and outer sidewall configuration of said tire casing, said roller being mounted on said second shaft for normally free rotation relative to the frame structure about the longitudinal axis of said second shaft whereby when said roller is moved into engagement with an inflated tire on said rim assembly and the latter is rotated by the prime mover during interengagement of said pinions, the camelback fed onto the tread portion and sidewalls of the tire casing is pressed into firm engagement therewith by said surface of the roller.

3. Tire processing apparatus as set forth in claim 2 wherein is provided a third pinion, said means mounting the second pinion for movement into and out of engagement with said first pinion, mounting the third pinion for shifting movement into and out of intermeshing relationship with said first pinion alternately with interengagement of said first and second pinions, and means operably coupling the third pinion to said prime mover.

4. Tire processing apparatus as set forth in claim 3 wherein said second and third pinions are positionable in locations both clearing said first pinion to permit freewheeling of said first shaft and thereby the rim assembly and tire casing thereon.

5. Tire processing apparatus as set forth in claim 4 wherein said means coupling said third pinion to the prime mover includes means for reducing the speed of said third pinion with respect to the speed of said second pinion.

References Cited in the file of this patent

UNITED STATES PATENTS

| | | |
|---|---|---|
| 1,260,992 | Stevens | Mar. 26, 1918 |
| 2,498,953 | Glynn | Feb. 28, 1950 |
| 2,556,264 | Flynn | June 12, 1951 |
| 2,717,022 | Duerksen | Sept. 6, 1955 |
| 2,808,872 | Clapp | Oct. 8, 1957 |